United States Patent
Harvey

[11] Patent Number: 5,831,525
[45] Date of Patent: Nov. 3, 1998

[54] FILTERED AIR, TEMPERATURE CONTROLLED REMOVABLE COMPUTER CARTRIDGE DEVICES

[76] Inventor: James C. Harvey, 1336 Jasmine Ave., Tarpon Springs, Fla. 34689

[21] Appl. No.: 932,701

[22] Filed: Sep. 18, 1997

[51] Int. Cl.[6] .................................................. G08B 29/00
[52] U.S. Cl. ................... 340/507; 340/501; 364/708.1; 364/709.02; 364/710.02; 361/687; 361/688; 361/695
[58] Field of Search .................................. 340/500, 501, 340/507; 364/551.01, 551.02, 552, 602, 708.1, 709.02, 710.02; 206/383.1; 174/16.1; 361/683, 687, 688, 690, 692, 694, 695; 360/131, 132, 133

[56] References Cited

U.S. PATENT DOCUMENTS

| | | |
|---|---|---|
| Re. 34,369 | 9/1993 | Darden et al. ........................... 439/377 |
| D. 308,052 | 5/1990 | Darden et al. ........................... D14/109 |
| 4,086,659 | 4/1978 | Cizmic et al. ........................... 360/73.3 |
| 4,941,841 | 7/1990 | Darden et al. ........................... 439/377 |
| 5,442,513 | 8/1995 | Lo ............................................. 361/685 |
| 5,563,767 | 10/1996 | Chen ........................................ 361/685 |

*Primary Examiner*—Jeffery A. Hofsass
*Assistant Examiner*—Daryl C. Pope
*Attorney, Agent, or Firm*—Albert J. Dalhuisen

[57] ABSTRACT

The present invention provides for removable cartridge devices including removable cartridges having fan assisted cooling for housing data storage devices and brackets adapted for removably mounting the cartridges. Various features of these cartridge systems include temperature dependent fan speed control, fan failure alarms, data storage device identification number LED display and air filtration systems. Methods are provided for removably mounting these cartridges in a computer.

25 Claims, 13 Drawing Sheets

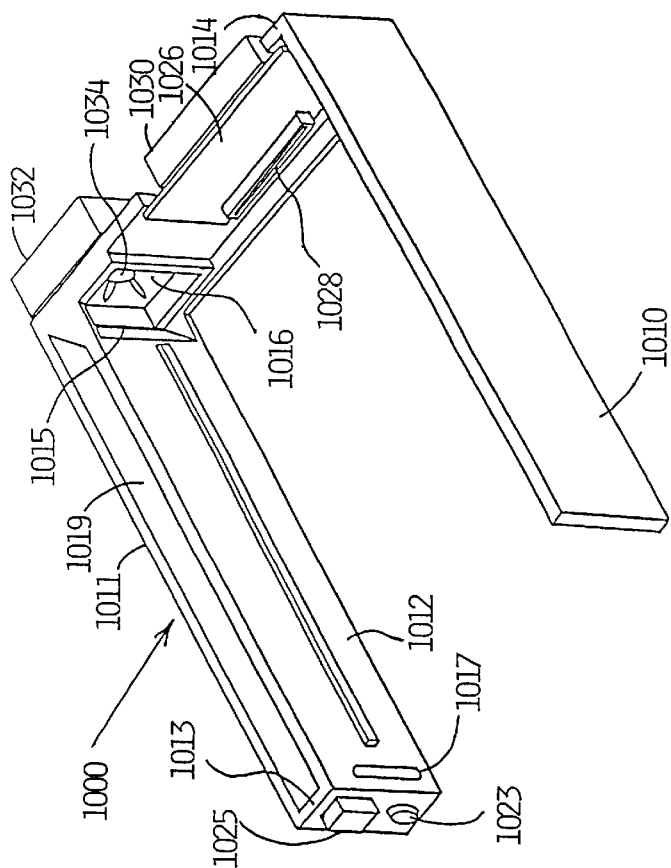
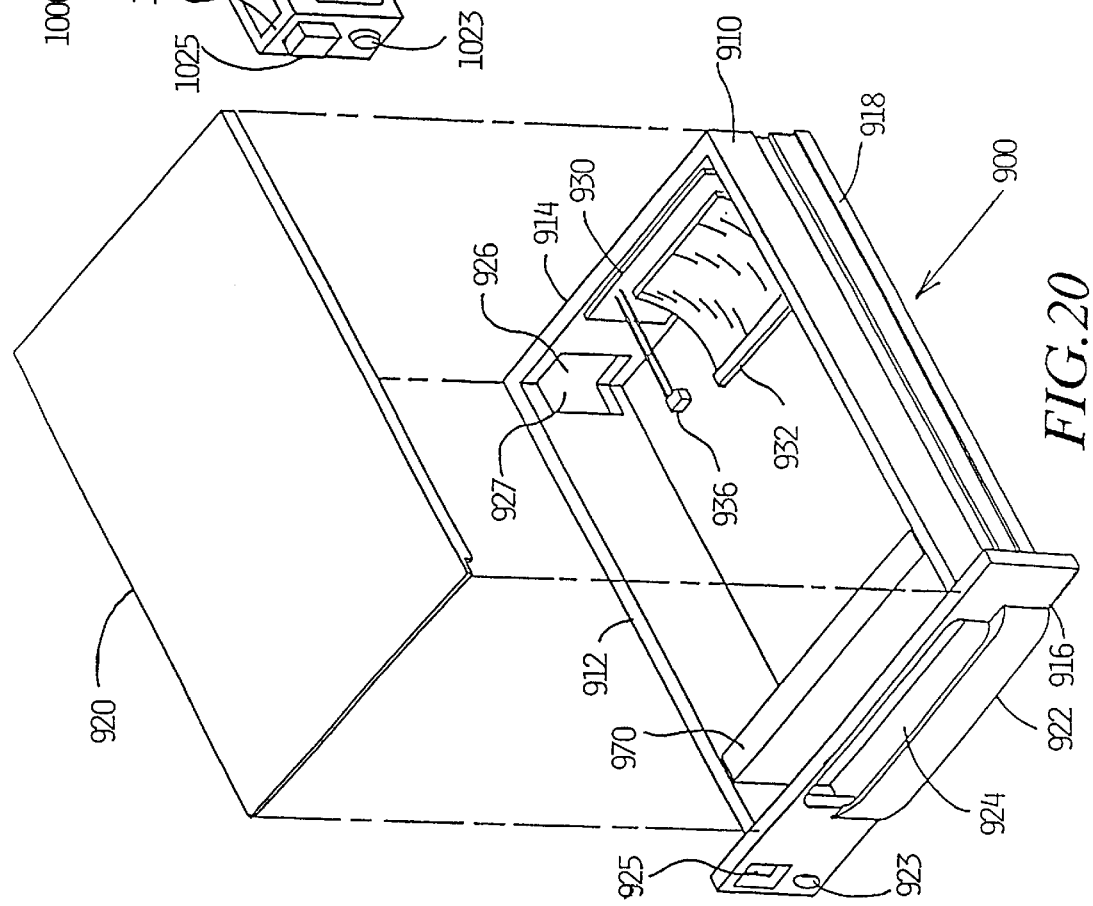

FILTERED AIR, TEMPERATURE CONTROLLED REMOVABLE COMPUTER CARTRIDGE DEVICES

FIELD OF THE INVENTION

The present invention relates to computer hardware devices. More particularly, the invention relates to computer hardware devices including removable cartridges for housing data storage devices and mounting brackets for mounting the cartridges. Still more particularly, the invention relates to temperature controlled removable cartridges for housing data storage devices and mounting brackets for mounting the cartridges in a computer.

BACKGROUND OF THE INVENTION

Computers such as personal computers usually employ one or more data storage devices such as hard disk drives (also known as fixed disk drives), floppy disk drives, tape drives, and optical data storage devices such as a CD-ROM and magnito optical devices.

Typically, the drives of these storage devices are permanently mounted inside the computer. While floppy disks and CD-ROM disks are generally removable from their respective drive systems, hard disks are usually not removable. However, there is need for removable hard disks where the hard disk contains sensitive data which must be protected from access by unauthorized persons. This need has led to the development of hard disk drives (hard drives) which are mounted in a drawer type cartridge which can be removed from the computer for storage in a secured remote location. Cartridge mounted removable hard drives are also utilized in redundant arrays of inexpensive disks (RAID) in which data is copied on multiple disks. Ease of removal and exchange of hard drives is particularly important in a RAID application.

Typically, a mounting bracket for the cartridge is permanently installed in a half-height space of the computer. The mounting bracket and the cartridge are configured for sliding the cartridge in and out of the bracket to allow relatively easy removal and insertion of the cartridge in the computer. Mating electrical connectors on the cartridge and the bracket provide electrical communication between the computer and the hard drive system installed in the cartridge, when the cartridge is fully inserted in the bracket.

Examples of cartridges adapted for use with hard drives and matching mounting brackets are shown in U.S. Pat. Nos. Re. 34,369 (Darden et al., 1993) and Des. 308,052 (Darden et al., 1990).

Prior art removable cartridges for housing data storage devices, such as the cartridges and brackets exemplified in the '369 and '052 patents, have proven quite successful in the past. However, improvements to the removable cartridges are highly desirable in order to make the cartridges more suitable for use with higher performance hard drives which require more effective cooling than the hard drives for which the removable cartridges were originally developed. The height of a removable cartridge for housing data storage devices is generally limited to the so called half-height space (about 1½ inch) in a computer or a RAID. This height limitation means that it is commonly not feasible to improve the hard drive cooling by increasing the air space around the hard drive. The cooling limitation due to the need to fit the cartridge in a half-height space is even more critical with recently developed high performance hard drives because of the larger size of these hard drives.

Removable cartridges which use a fan to assist in cooling the hard drive are commonly used. It is well known that mechanical or electrical failure of the fan can result in overheating the hard drive, if use of the hard drive is continued without effective fan assisted cooling. The possible consequences of overheating the hard drive include loss of valuable data, damage to computer hardware and loss of computer operating time. It is therefore highly desirable to maximize the reliability of the cartridge's cooling fan and to provide the computer user with a system which will alert the user to operating conditions under which the cooling system of the cartridge mounted hard drive is malfunctioning.

Fan assisted cooling of a hard drive mounted in a removable cartridge results in the introduction of dust into the cartridge. When dust is deposited inside the cartridge, the air flow through the cartridge is impeded, also the fan assisted cooling of a hard drive is less effective when dust is deposited on its outside surface. Contact reliability problems can occur due to the presence of dust particles on contact surfaces of mating connectors.

Accordingly, the need exists for improved removable cartridges for housing data storage devices and mounting brackets for mounting the cartridges.

SUMMARY OF THE INVENTION

The present invention provides novel systems including removable cartridges for housing data storage devices and mounting brackets for mounting the cartridges, as well as methods for removably mounting data storage devices.

In one embodiment the present invention provides a removable cartridge for mounting a data storage device, having fan assisted air cooling and a mounting bracket for the cartridge, wherein the fan has a temperature dependent fan speed control.

In another embodiment the present invention provides a removable cartridge for mounting a data storage device, having fan assisted air cooling and a mounting bracket for the cartridge, additionally having a fan failure alarm.

In yet another embodiment the present invention provides a removable cartridge for mounting a data storage device, having fan assisted air cooling and a mounting bracket for the cartridge, additionally having a system for providing a data storage device identification number.

In still another embodiment the present invention provides a removable cartridge for mounting a data storage device, having fan assisted air cooling and a mounting bracket for the cartridge, additionally having an air filtration system.

In another embodiment the present invention provides methods for removably mounting a cartridge containing a data storage device in a computer mounted bracket wherein the cartridge has fan assisted air cooling and a temperature dependent fan speed control.

BRIEF DESCRIPTION OF THE DRAWINGS

FIG. 20 shows a partially exploded schematic perspective view of an alternate removable cartridge of the present invention.

FIG. 21 shows a schematic perspective view of an alternate U-bracket of the present invention.

DETAILED DESCRIPTION OF THE INVENTION

While describing the invention and its embodiments, certain terminology will be utilized for the sake of clarity. It is intended that such terminology include not only the recited embodiments but all equivalents which perform substantially the same function, in substantially the same manner to achieve substantially the same result.

The term "removable cartridge device" as defined herein includes a combination of a removable cartridge for housing a data storage device and a bracket adapted for removably mounting the cartridge. The term "removable cartridge air venting system" as defined herein includes a fan, circuit means for energizing the fan and an air passage between the fan and the interior of the cartridge.

Figure 2:
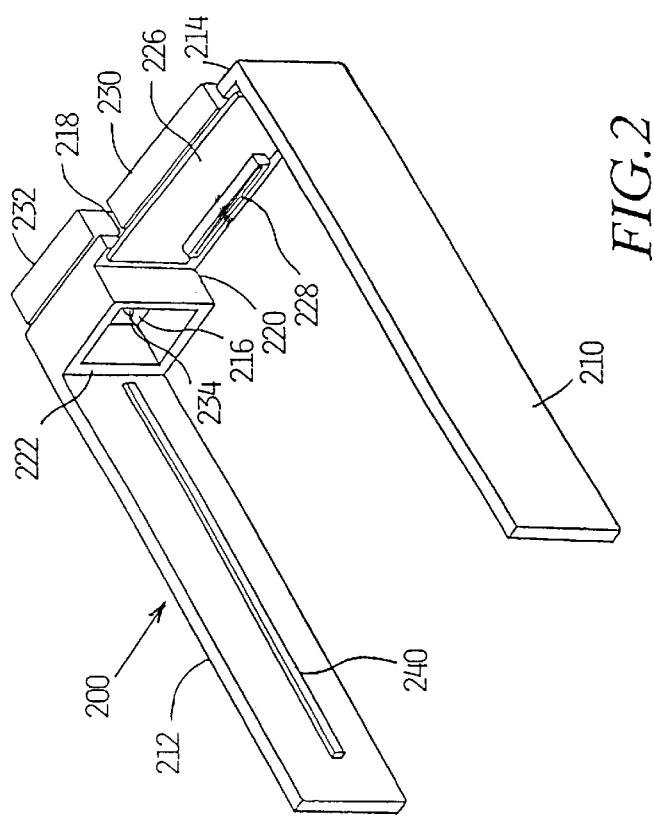
FIG. 2 shows a schematic perspective view of a U-bracket of the present invention.
Figure 3:
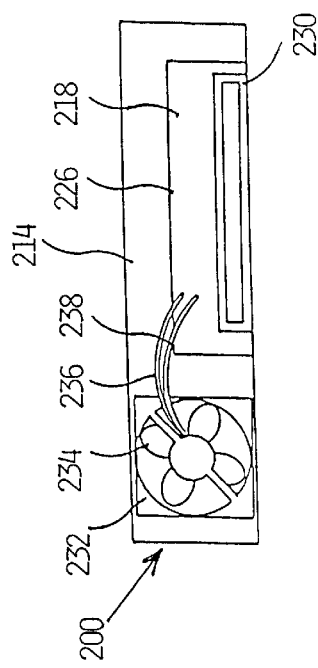
FIG. 3 shows a schematic rear elevation view of the bracket illustrated in FIG. 2.
Figure 1:
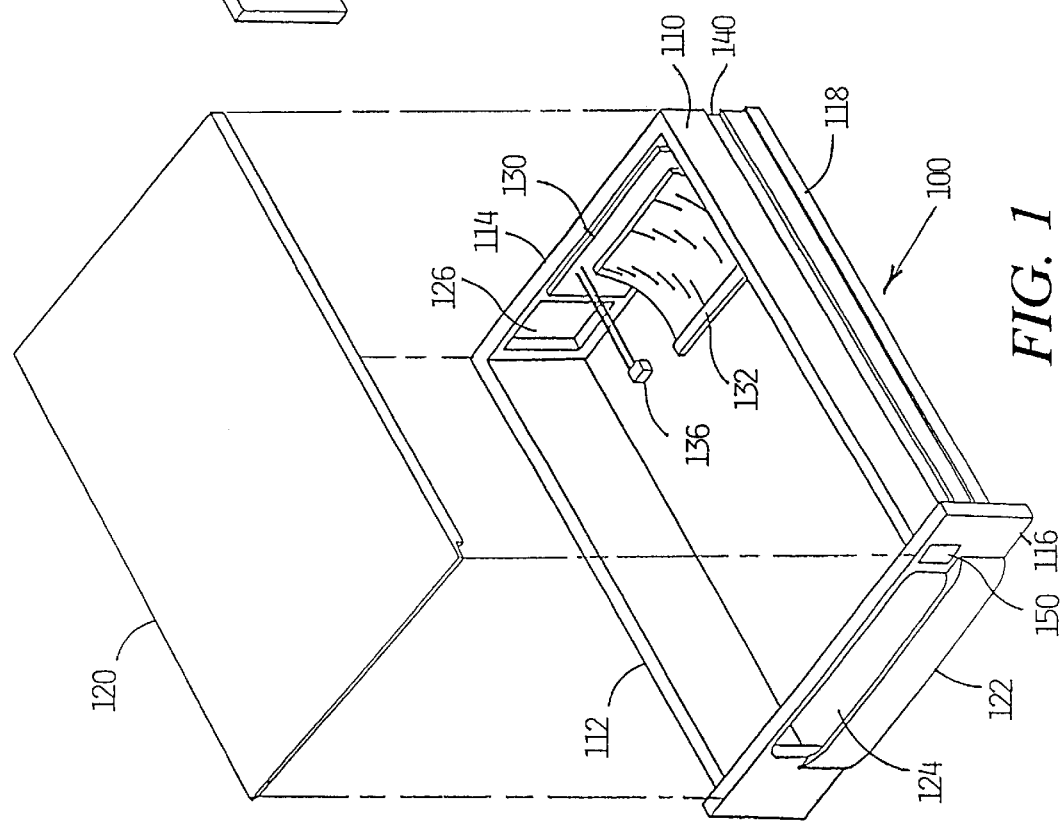
FIG. 1 shows a partially exploded schematic perspective view of a removable cartridge of the present invention.
Figure 4:
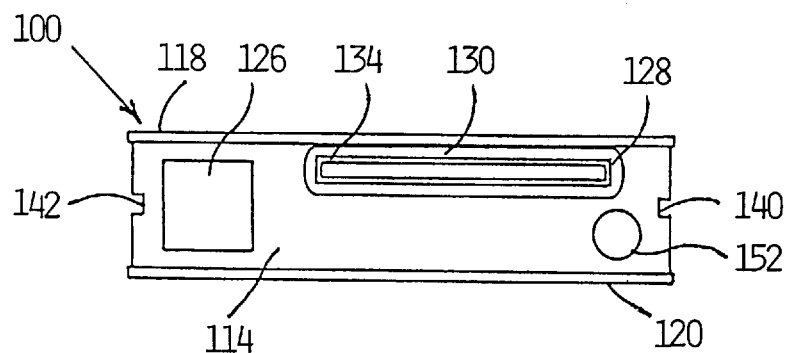
FIG. 4 shows a schematic rear elevation view of the cartridge illustrated in FIG. 1.

One embodiment of the present invention is illustrated in FIGS. 1–5, showing a removable cartridge device which includes removable cartridge 100 and cartridge mounting bracket 200, wherein FIGS. 1 and 2 depict the cartridge and the bracket in upside down positions in order to better illustrate the features of the invention. Cartridge 100 (FIGS. 1 and 4) includes a box-like structure having side panels 110 and 112, rear panel 114, front panel 116, top panel 118 and bottom panel 120. Side panels 110 and 112 are preferably substantially parallel to each other. Front panel 116 has a pull portion 122 and an open portion 124 adjacent the pull portion 122. Rear panel 114 includes open portions 126 (FIGS. 1 and 4) and 128 (FIG. 4). Front, side and rear panels 116, 110, 112 and 114 mounted in a substantially rectangular hollow structure form the casing of cartridge 100. This casing has an open top which is covered by top panel 118 while the open bottom of the casing is covered by bottom panel 120. An example of a housing for a removable cartridge of the present invention includes the casing of the cartridge and the top and bottom panels. A circuit board 130 is mounted inside rear panel 114. A multi-pin connector, such as ribbon connector 132 is connected to circuit board 130 inside cartridge 100. A multi pin connector 134 (FIG. 4) is connected to circuit board 130 such that connector 134 protrudes through open portion 128 of rear panel 114. A temperature sensing element 136 (FIG. 1) connected to circuit board 130 is positioned inside cartridge 100. The term "temperature sensing element" as used herein includes electrical and mechanical sensors which provide a temperature dependent response. Optionally, the temperature sensing element can be mounted on a bracket or a post.

Bracket 200, shown in FIGS. 2 and 3, has a U-shaped configuration including side panels 210 and 212, and rear panel 214, wherein side panels 210 and 212 are preferably parallel to each other. Side and rear panels 210, 212 and 214 mounted in a U-shaped hollow structure form the casing of bracket 200. Open portions 216 and 218 are provided in rear panel 214. An air duct 220 extends inside bracket 200 from open portion 216. This duct has a contact surface 222 inside bracket 200. A circuit board 226 is mounted on rear panel 214 inside the bracket. A multi pin connector 228 is mounted on this circuit board. Connector 228 is adapted for mating with connector 134 (FIG. 4) of the cartridge. A multi pin connector 230 is mounted on circuit board 226 such that connector 230 protrudes through open portion 218 of bracket rear panel 214, as shown in FIG. 3. A fan assembly 232, containing an electrically driven fan 234, is mounted on rear panel 214 such that fan 234 communicates with open portion 216 and duct 220. Leads 236 and 238 of fan 234 are connected to circuit board 226.

Figure 5:
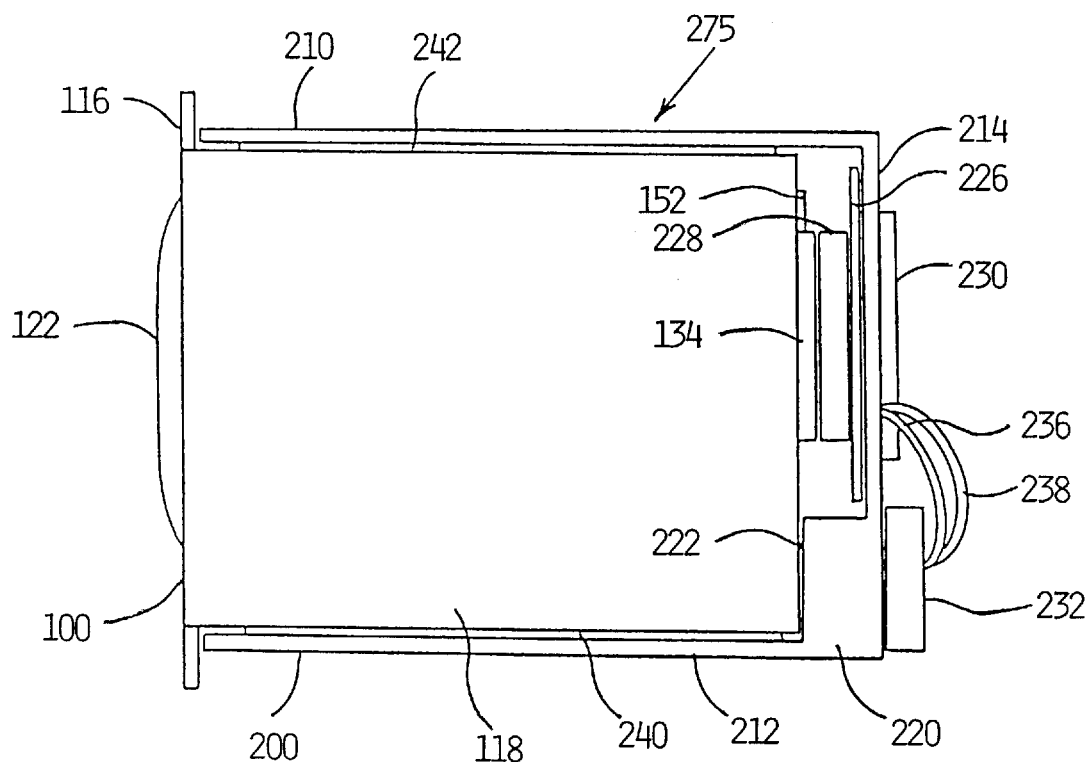
FIG. 5 shows a schematic plan view of the cartridge illustrated in FIG. 1, fully inserted in the bracket illustrated in FIG. 2.

Cartridge 100 is adapted for sliding into bracket 200 in a drawer-like fashion, utilizing such well known drawer sliding systems as grooves 140 and 142 (FIGS. 1 and 4) in the outside of the cartridge side panels and matching rails, such as rails 240 and 242 shown in FIGS. 2 and 5, inside the bracket side panels. FIG. 5 depicts removable cartridge device 275 including cartridge 100 fully inserted in bracket 200 using the drawer technology. The present invention is not limited to any particular drawer sliding system provided that the cartridge is adapted to slide into the bracket in such manner that connectors 134 and 228 make mating electrical contacts and provided that duct contact surface 222 of the bracket makes substantial contact with the outside surface of cartridge rear panel 114 outside its open portion 126. Another suitable drawer sliding system (not shown) includes having inward facing U-shape channels inside the side panels of the bracket and having a cartridge which is adapted for sliding inside these channels. Preferably, cartridge rear panel 114 and open portion 126 provide a substantial match in size and shape to contact surface 222 of the bracket in order to form an air channel connecting the inside of the cartridge with the fan which is mounted on the outside of the bracket, while not allowing a substantial fan assisted air flow between the outside of the cartridge and the inside of the bracket.

Bracket 200 is mounted inside a computer, such as a personal computer (not shown) or RAID (not shown) such that the open front (i.e. the side which is opposite rear panel 214) faces the outside of the computer or RAID to provide a ready access for sliding cartridge 100 into computer mounted bracket 200. A data storage device, such as a hard drive (not shown) can be mounted inside cartridge 100 using conventional techniques such as mounting brackets and mounting holes (not shown) which can be prepared in appropriate positions in sides 110 and 112 of cartridge 100. Alternately, hard drive mounting holes can be provided in the side panels of the cartridge to fit different hard drives, as will be discussed in connection with FIG. 14. The hard drive is connected to circuit board 130 through a connector, such as a multi pin ribbon connector 132 and any other connectors (not shown).

The computer's electronic circuitry (not shown) which is necessary for operating the cartridge mounted data storage device and for energizing fan 234 (FIGS. 2 and 3) is connected to circuit board 226 of bracket 200 through multi pin connector 230 and to any other connectors which are deemed necessary for the use of cartridge 100. The computer's electronic circuitry for the hard drive is continued through circuit board 226 to multi pin connector 228. Once cartridge 100 is fully inserted in computer mounted bracket 200, the computer's circuitry for the hard drive is continued from connector 228 on bracket 200 to the data storage device through cartridge connector 134 which makes a mating contact with connector 228, through circuit board 130 and through connector 132. The data storage device is thus connected to the computer's electronic circuitry. Additional connectors may be used in addition to the multi pin connectors described above to provide the necessary connections between the data storage device and the computer or RAID.

Returning to FIGS. 1 and 2, a suitable example of the temperature sensing element 136 of the embodiment of cartridge 100 includes a thermistor which controls the speed of bracket mounted fan 234 such that an increase in the air temperature inside the cartridge results in an increase in fan rotational speed to provide increased air flow through the cartridge when the cartridge is fully inserted in the bracket, as will be discussed more fully in connection with FIG. 6. Fan 234 is wired to expel air from the fully inserted cartridge through cartridge open portion 126, while air is introduced into the cartridge through open portion 124 of front panel 116 (FIG. 1), thus providing an air flow through the interior of the cartridge. Open portion 124 forms the air inlet while open portion 126 forms the air outlet of the cartridge. An air passage between the fan and the inside of the cartridge is provided by open portion 126 (FIG. 1) of cartridge 100, duct 220 of bracket 200 and open portion 216 of bracket 200 (FIG. 2).

Figure 9:
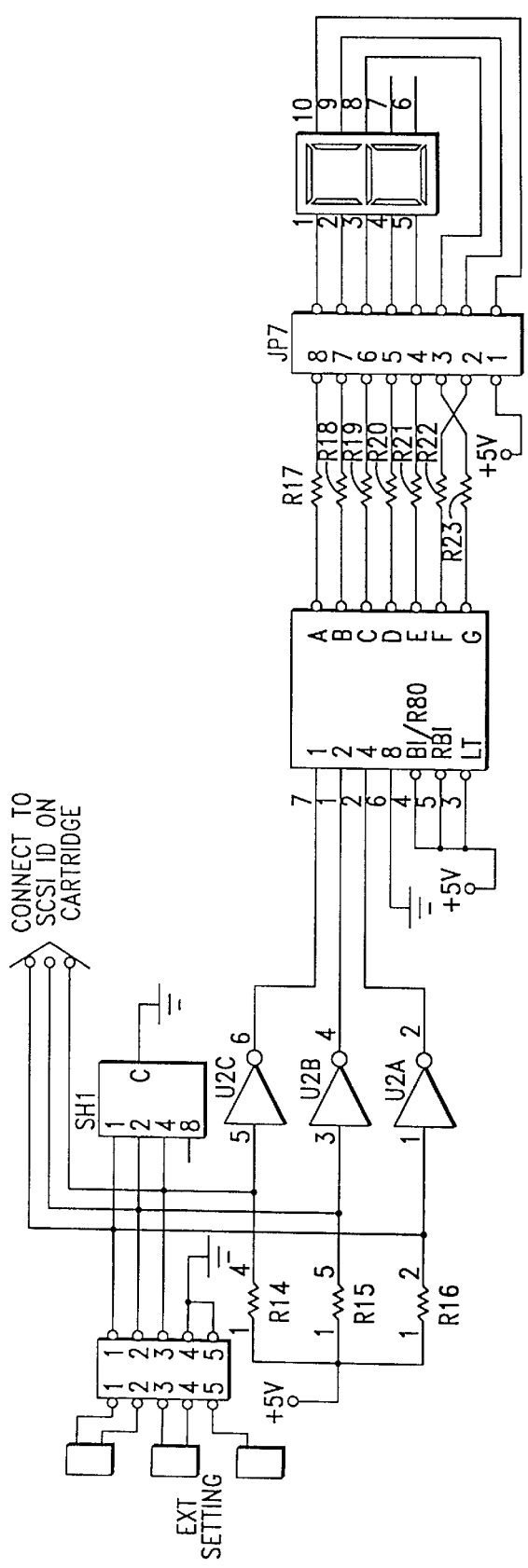
FIG. 9 is a schematic circuit diagram including a circuit for a data storage device identification number of the present invention.
Figure 12:
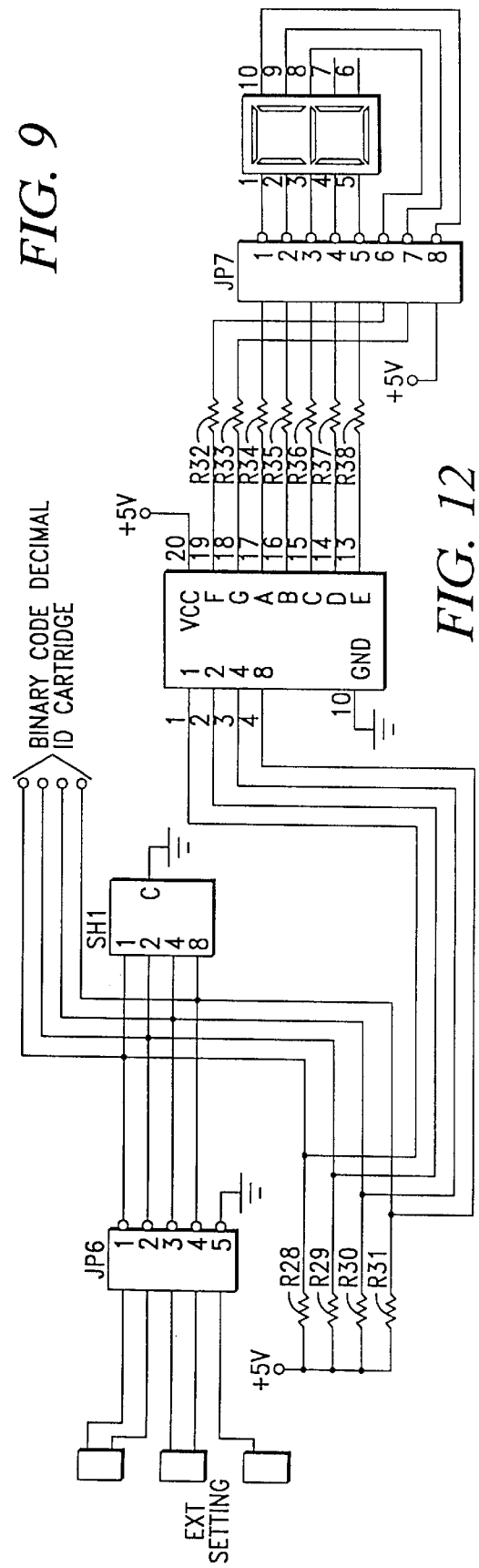
FIG. 12 is a schematic circuit diagram including an alternate circuit for a data storage device identification number of the present invention.

Additionally, a data storage device identification number display LED 150 (see, FIG. 1) can be provided in front panel 116 of cartridge 100. This display can be connected to circuit board 130 (connectors not shown). A rotary type identification selector switch, such as rotary switch 152, can be mounted on the outside of cartridge rear panel 114 as depicted in FIGS. 4 and 5). The identification selector switch 152 can be connected to circuit board 130 (connectors not shown) of the cartridge. This switch is adapted to be set manually, to select identification numbers for display by LED 150. The identification settings are decoded by the binary code switch and converted into a four bit signal. The four bit signal is transformed into seven independent signals via an encoder which drives the seven segment display LED as shown in detail in FIG. 9 for a SCSI interface and in FIG. 12 for a Fast & Wide SCSI-II interface. The necessary circuits and components to transform the signal are provided on circuit board 130 and connected to the computer's circuitry. The data storage device identification number system includes LED 150, selector switch 152 and the necessary electronic circuits to transform the signal such that the LED and the selector switch are fully operable. This technique enables the computer controller to identify each data storage device, such as a hard drive, by number. A computer user can thus visually identify each disk drive by its seven segment display. The hard drive identification feature is particularly important for the use of cartridge mounted removable hard drives in RAID applications.

Cartridge 100 of the present invention optionally includes an alarm to indicate a fan failure or malfunction. The current driving the fan is constantly monitored by a fan failure circuit. When the fan current is outside a predetermined range, a signal generator which is incorporated in the alarm circuit generates an intermittent signal to cause the identification number display LED to flash or to activate an audible signal, such as a buzzer signal. These visual and audible alarm signals warn the computer user that the fan is failing, possibly resulting in a damaging increase in the temperature of the data storage device if computer use is continued.

Figure 6:
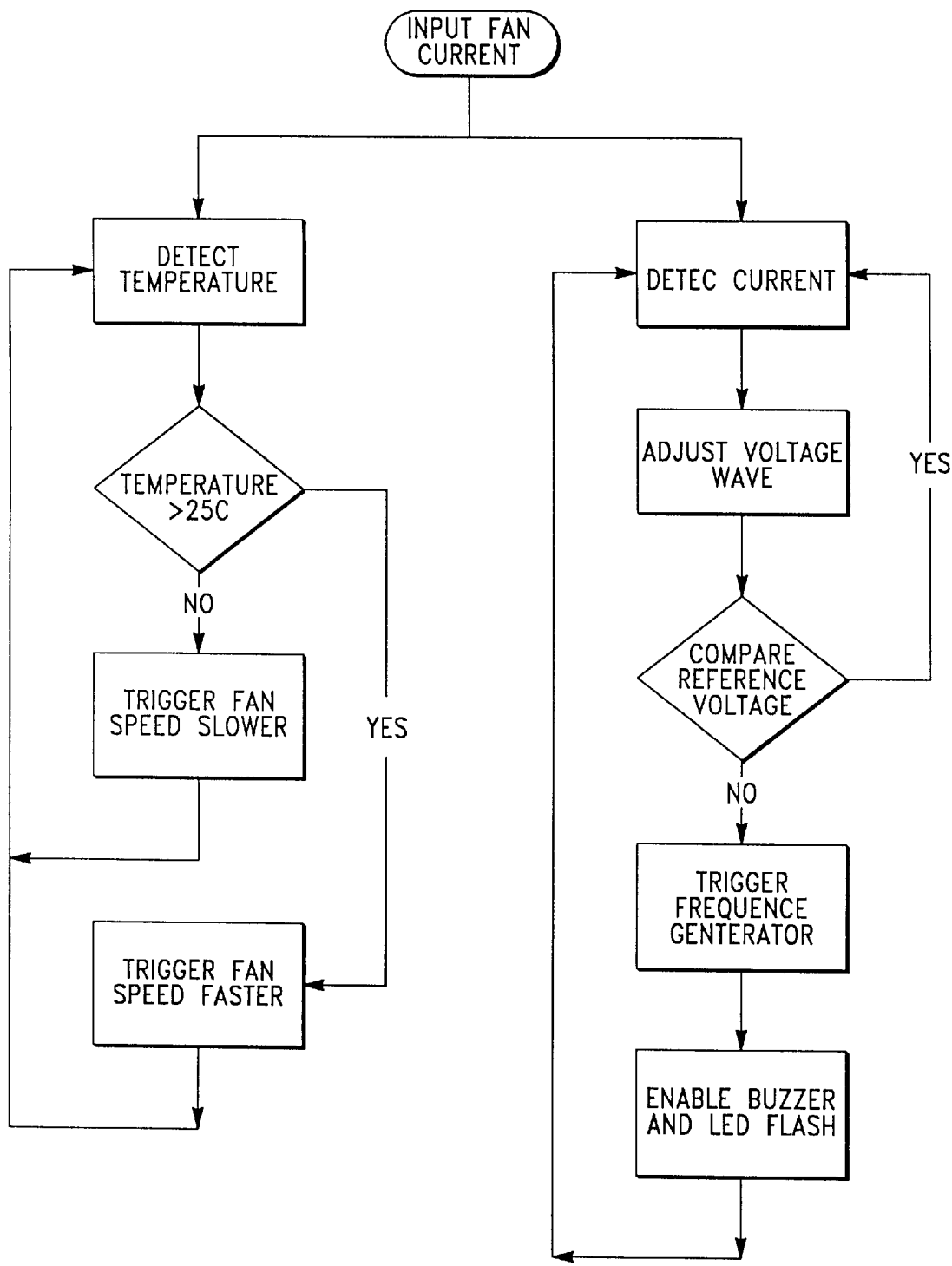
FIG. 6 shows a flowchart illustrating the techniques of the present invention for temperature dependent fan speed control and for fan failure alarm.
Figure 8:
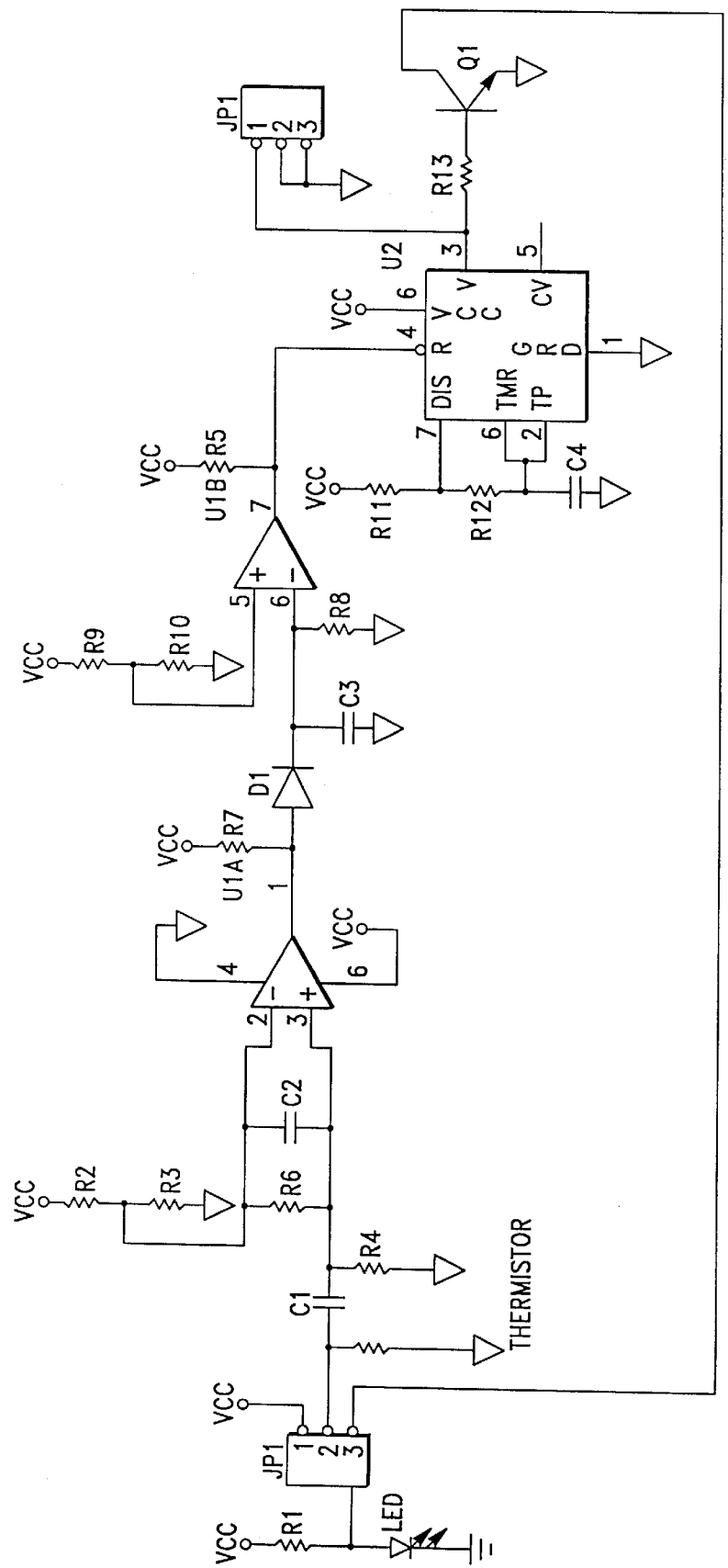
FIG. 8 is a schematic circuit diagram showing the embodiments illustrated in FIG. 6.

The systems for controlling the temperature dependent fan speed and generating the fan failure alarm signals are illustrated in FIG. 6. The fan speed control system functions by providing a current through the fan and through the thermistor which is in series with the fan (see FIG. 8). A change in thermistor temperature causes a change in thermistor resistance resulting in a change in thermistor current and therefore a change in fan current and consequently a change in fan speed. For example, an increase in thermistor temperature results in a decreased resistance and corresponding increase in current. The increase in current produces an increased fan speed. Because of the fan speed control process of the present invention it is not necessary to always run the fan at its maximum speed, thereby prolonging the life of the fan and thus improving its reliability. FIG. 6 illustrates the use of a thermistor which has been calibrated or adjusted such that the fan speed increases at temperatures >25° C. and decreases at temperatures <25° C., thus using the temperature at 25° C. as a system control point. The fan speed control system can similarly be operated using a thermistor at control points other than 25° C.

The fan failure alarm system of the present invention is illustrated in FIG. 6 as follows. The fan current is detected by measuring the detection voltage wave (using IC UIA, FIG.8). This detection voltage is amplified if necessary to make it more easily measurable and compared with a predetermined reference voltage wave (using IC UIB, FIG. 8). If the detection voltage is outside the predetermined range, a frequency generator (U2, FIG. 8) is activated to cause the identification number display LED to flash and optionally to provide a buzzer sound thus alerting the computer user to a fan malfunction or failure.

Figure 7:
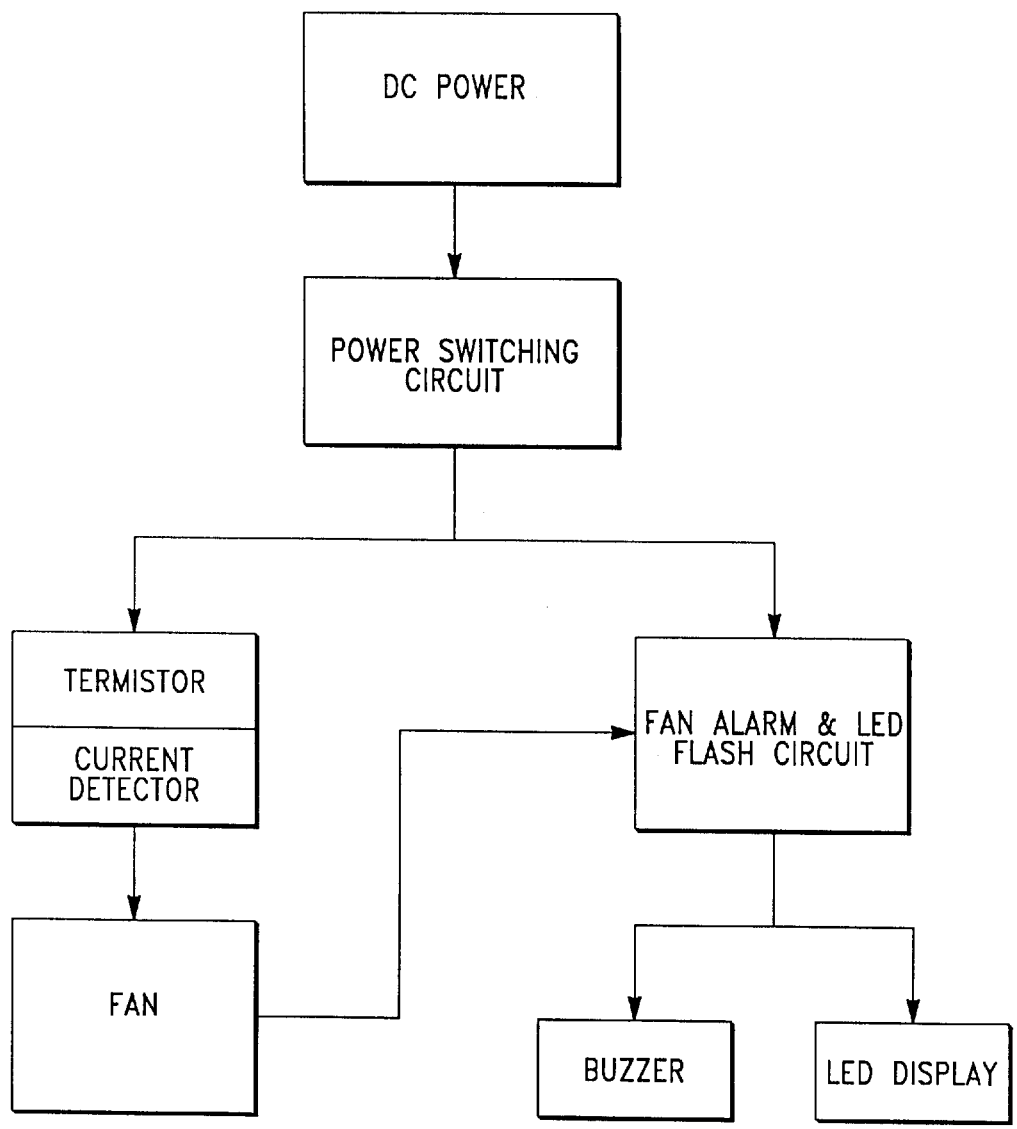
FIG. 7 shows a block diagram of the embodiments of the present invention illustrated in FIG. 6.
Figure 10:
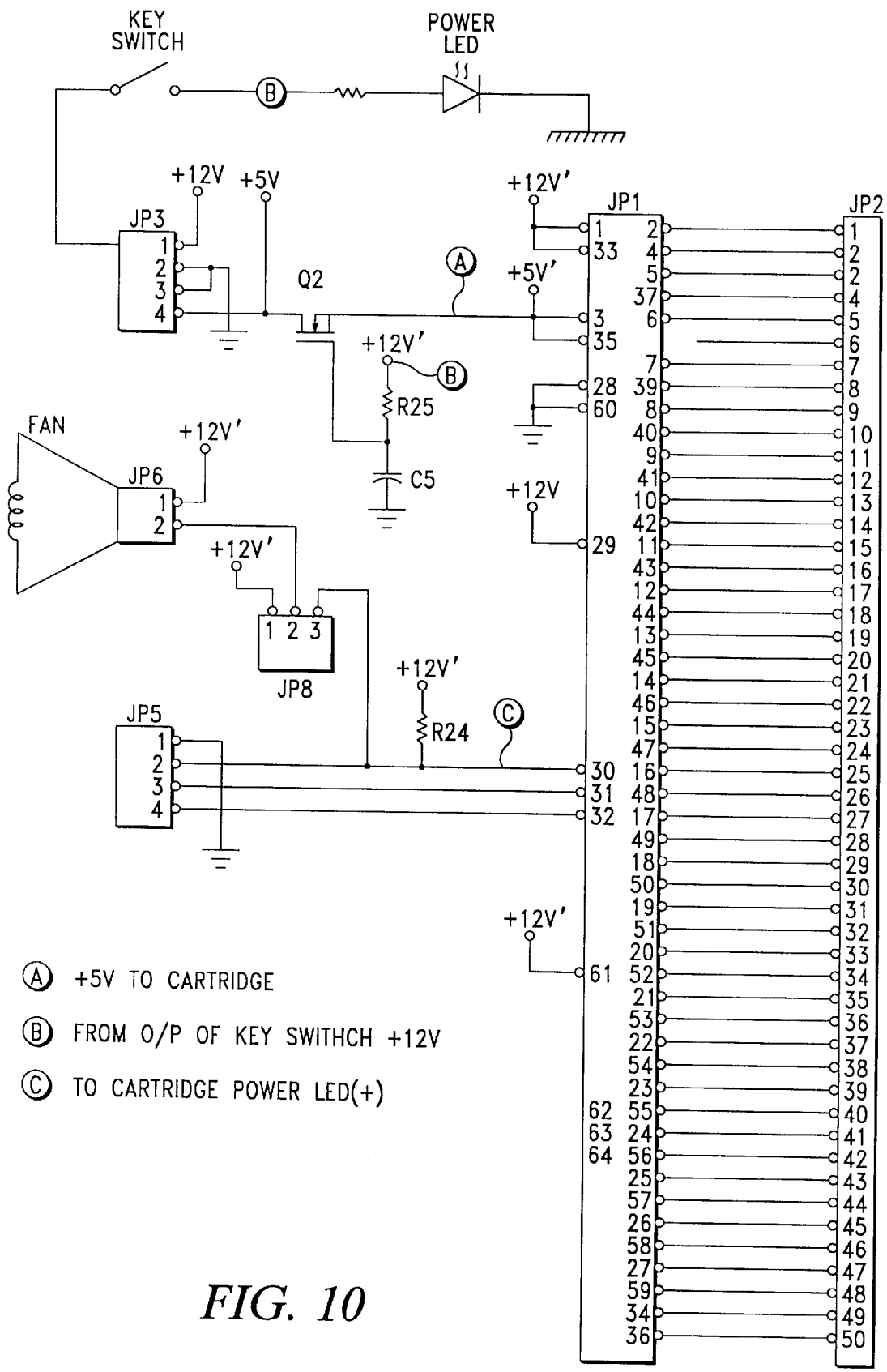
FIG. 10 is a schematic circuit diagram including a power circuit for providing power to a fan of the present invention.
Figure 11:
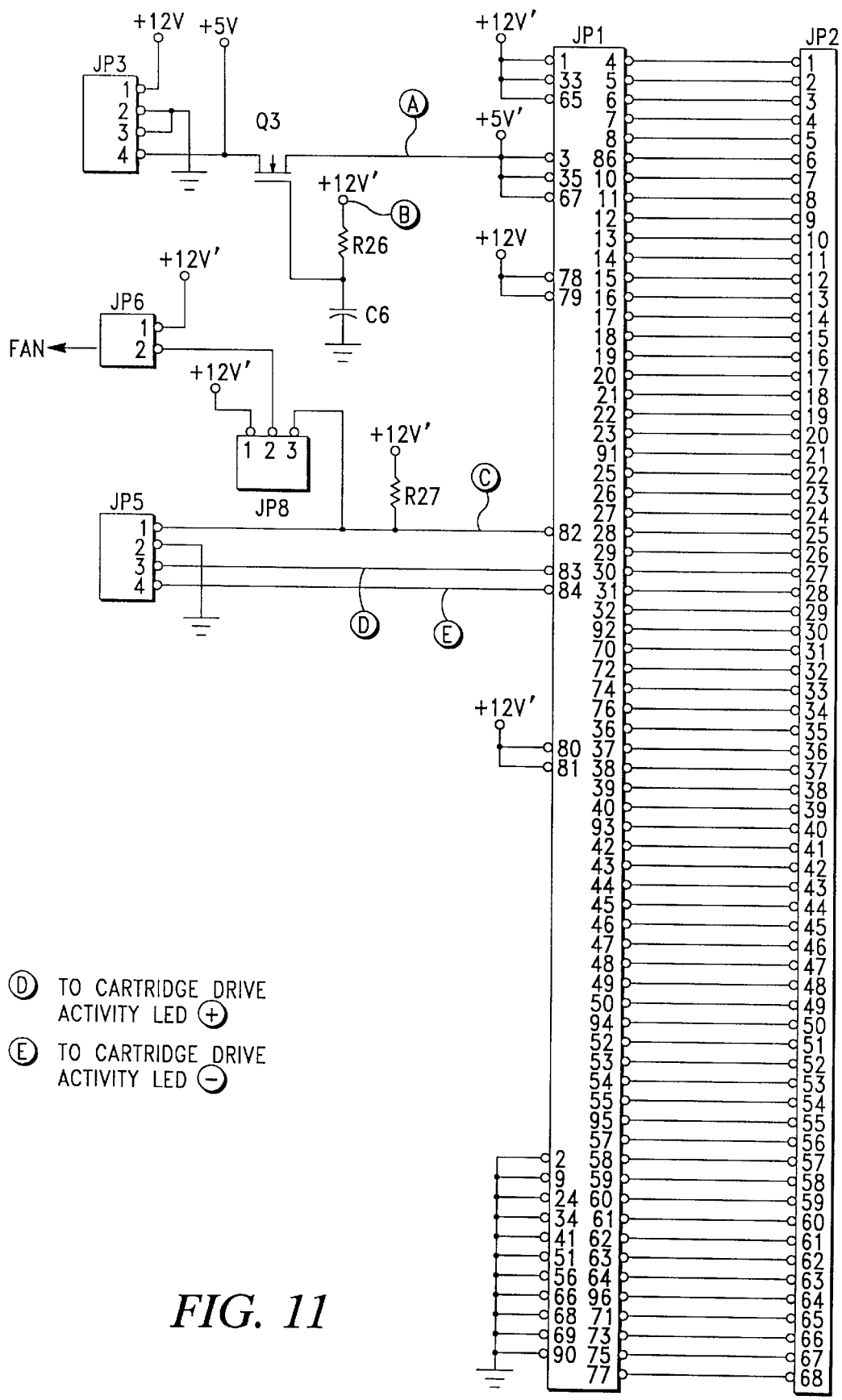
FIG. 11 is a schematic circuit diagram including an alternate power circuit for providing power to a fan of the present invention.

Various circuits and components of the fan speed control system and the fan failure alarm system are identified in FIG. 7. The various circuits can be positioned on either the cartridge or the bracket such as on circuits boards 130 (FIG. 1) or 226 (FIG. 2), except that the thermistor and the display LED are positioned as described above. Power to these circuits is provided by the computer to the circuit boards, through the use of connectors 230, 228 and 134, or through the use of other suitable connectors. Additionally, power sources such as batteries, can be connected to these circuit boards as needed. The power circuits for providing power to the fan are shown in FIGS. 10 and 11 for a SCSI and a Fast & Wide SCSI-II interface respectively.

Figure 13:
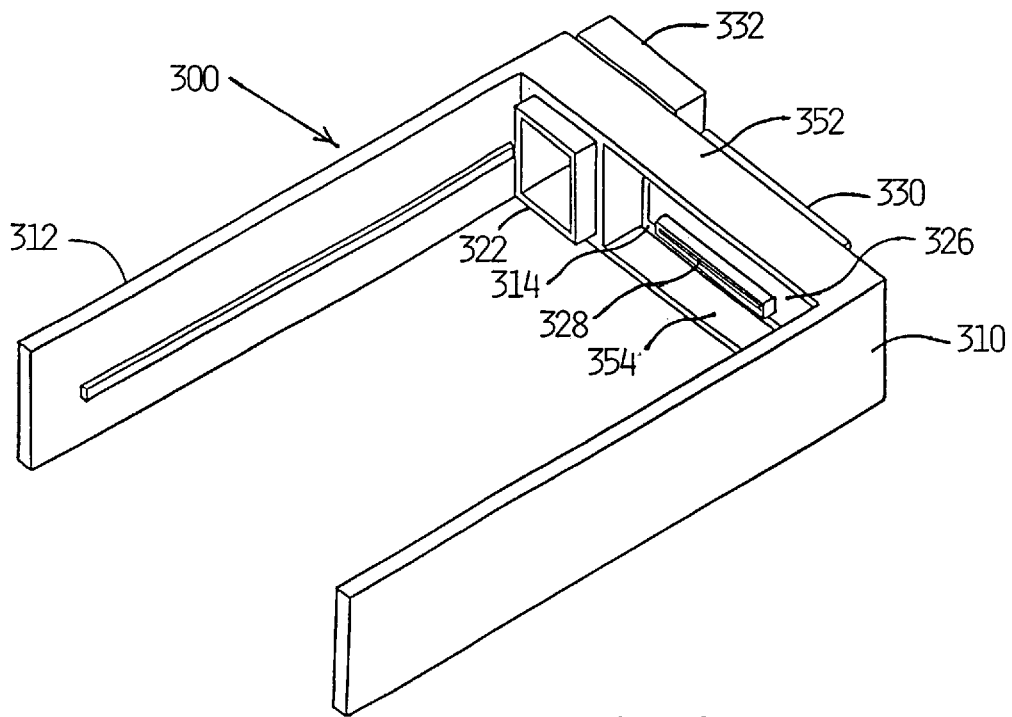
FIG. 13 shows a schematic perspective view of an alternate U-bracket of the present invention.

Alternate embodiments (not shown) of cartridge 100 and bracket 200 include positioning circuit board 130 on cartridge rear panel 114 outside the cartridge, providing that temperature sensing element 136 and ribbon connector 132 are positioned inside this cartridge, or positioning circuit board 226 on the outside of bracket rear panel 214 providing that connectors 134 and 228 are adapted for making electrical contact when the cartridge is fully inserted in the bracket. Alternate configurations of the U-shaped bracket include the configuration illustrated in FIG. 13 showing bracket 300 adapted for use with a cartridge such as cartridge 100 shown in FIG. 1. Bracket 300 includes side and rear panels 310, 312 and 314 similar to side and rear panels 210, 212 and 214 of bracket 200 depicted in FIG. 2. Also, circuit board 326, fan assembly 332 and connectors 328 and 330 of bracket 300 are similar to circuit board 226, fan assembly 232 and connectors 228 and 230 of bracket 200. However, while bracket 200 has a duct with a contact surface 222, bracket 300 has a duct with a flange extension 322. Flange extension 322 is adapted for fitting inside open portion 126 of cartridge 100 (FIG. 1) when the cartridge is fully inserted, in order to minimize fan assisted air flow between the inside of the bracket and the outside of the cartridge. Additionally, bracket 300 has one or more cross braces such as braces 352 and 354 between the side panels to provide additional rigidity to the bracket.

Figure 15:
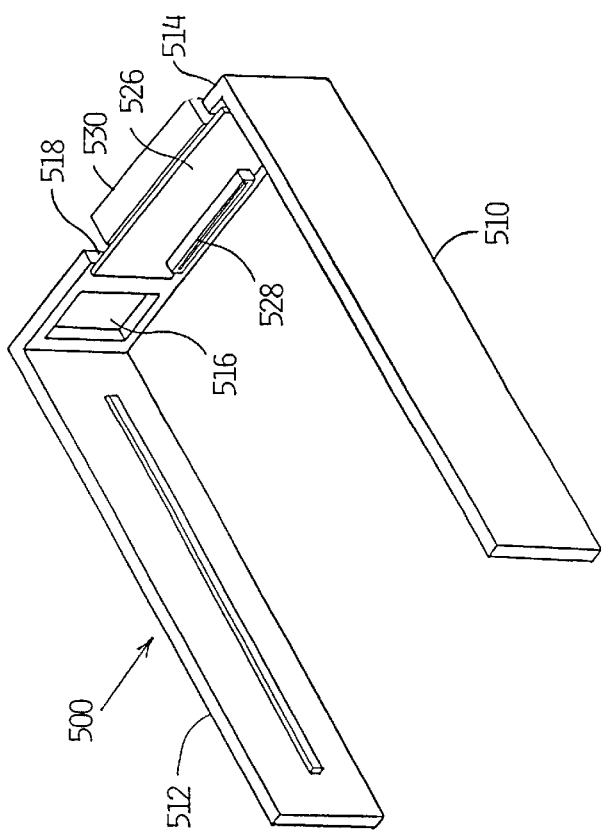
FIG. 15 shows a schematic perspective view of an alternate embodiment of the bracket of FIG. 2.
Figure 14:
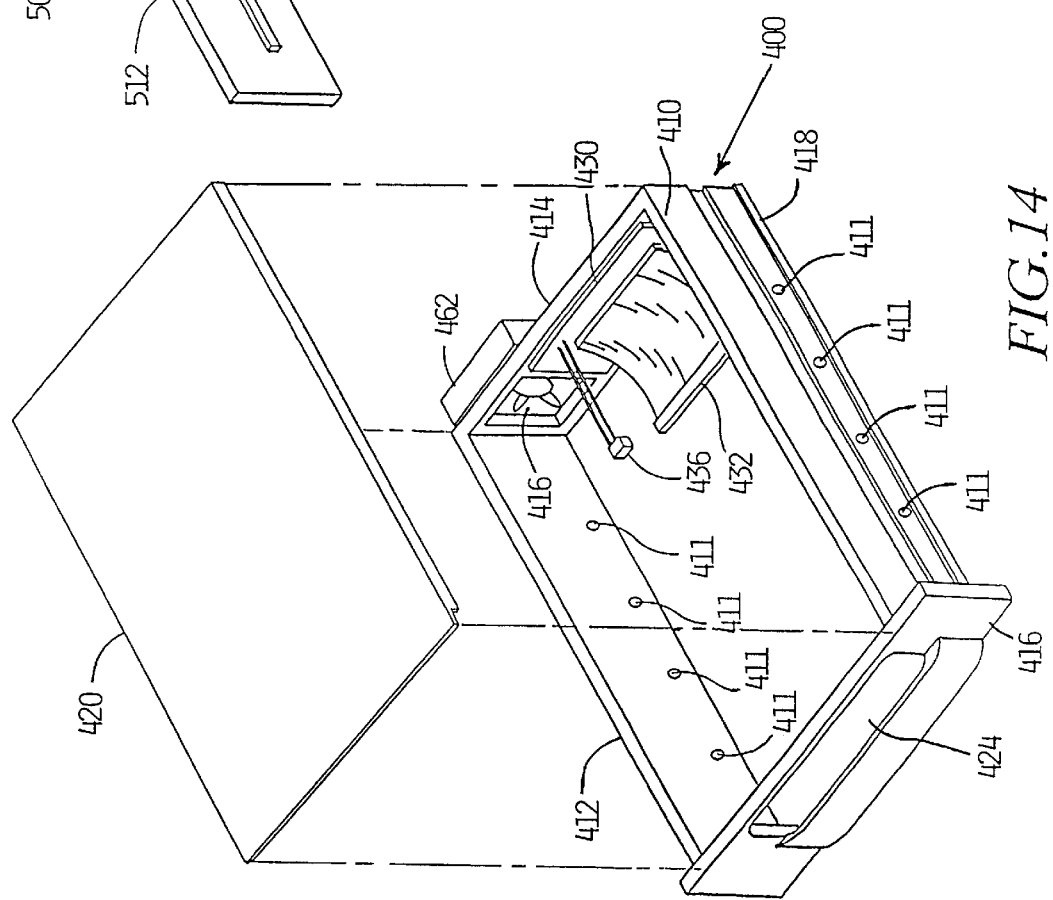
FIG. 14 shows a partially exploded schematic perspective view of an alternate embodiment of the cartridge of FIG. 1.

An alternate embodiment of the present invention is illustrated in FIGS. 14 and 15 showing a removable cartridge device which includes removable cartridge 400 for housing a data storage device and a matching U-shaped bracket 500. The main differences between the embodiment illustrated in FIGS. 1 and 2 compared with the embodiment shown in FIGS. 14 and 15 are differences in the position of the fan assembly and the use of mounting holes for a data storage device, such as a hard drive, in cartridge 400. Side panels 410 and 412 of cartridge 400 are provided with mounting holes 411 for mounting a hard drive. The number, position and size of these holes are predetermined to fit various hard drives which are commonly available. Apart from these predetermined mounting holes, side panels 410 and 412 of cartridge 400 are similar to side panels 110 and 112 of cartridge 100. Rear panel 414 and front panel 416 of cartridge 400 are similar to the corresponding panels of cartridge 100, while covers 418 and 420 of cartridge 400 are similar to the corresponding covers of cartridge 100. Front, side and rear panels 416, 410, 412 and 414 are mounted in a substantially rectangular hollow structure to form the casing of cartridge 400. This casing together with covers 418 and 420 provide an example of a housing for the removable cartridge of the current invention.

Figure 16:
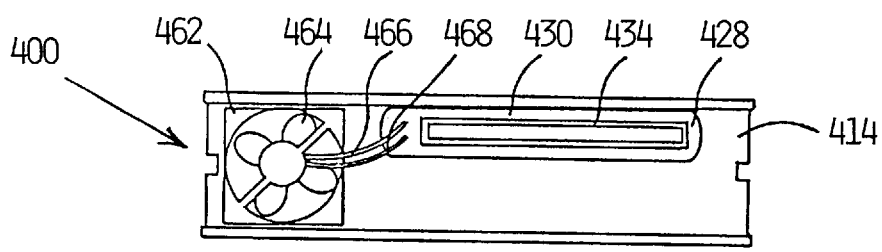
FIG. 16 shows a schematic rear elevation view of the cartridge illustrated in FIG. 14.

As illustrated in FIGS. 14 and 16, fan assembly 462 having a fan 464, is mounted on rear panel 414 of cartridge 400 such that fan 464 communicates with open portion 416 of the rear panel. Open portion 416 thus provides an air passage between the fan and the inside of the cartridge. Leads 466 and 468 (FIG. 16) connect the fan with circuit board 430 through rear panel open portion 428. Circuit board 430 is mounted inside cartridge 400. Multi pin connector 434 is connected to circuit board 430 such that this connector protrudes through open portion 428 of the rear panel. A connector, such as ribbon connector 432 and temperature sensing element 436 are positioned inside the cartridge, these are connected to circuit board 430 as shown in FIG. 14.

FIG. 15 illustrates bracket 500 which is adapted for receiving cartridge 400. Bracket side panels 510 and 512 are similar to the corresponding side panels of bracket 200 (FIG. 2). A circuit board 526 is mounted inside rear panel 514. A multi pin connector 528 is positioned inside the bracket and is connected to circuit board 526. Connector 528 is adapted for making a mating electrical connection with connector 434 of cartridge 400 when the cartridge is fully inserted in the bracket. Multi pin connector 530 is connected to circuit board 526 such that it protrudes through open portion 518 of rear panel 514. Optionally, one or more open portions such as portion 516 are provided in rear panel 514 to assist in venting air which has been expelled from cartridge 400 by fan 464. Side and rear panels 510, 512 and 514 mounted in a U-shaped hollow structure forming the casing of bracket 500. Bracket 500 is installed in a computer or RAID as described in connection with bracket 200. The computer's electronic circuitry (not shown) for operating the cartridge mounted data storage device and for energizing fan 464 is connected to circuit board 526 through multi pin connector 530 and to any other connectors which are necessary for the use of cartridge 400. When a data storage device, such as a hard drive (not shown), is installed in cartridge 400, it is connected to circuit board 430 (FIG. 14) through connector 432 and is then connected to the computer's circuitry through connectors 434 and 528, circuit board 526 and connector 530.

Figure 18:
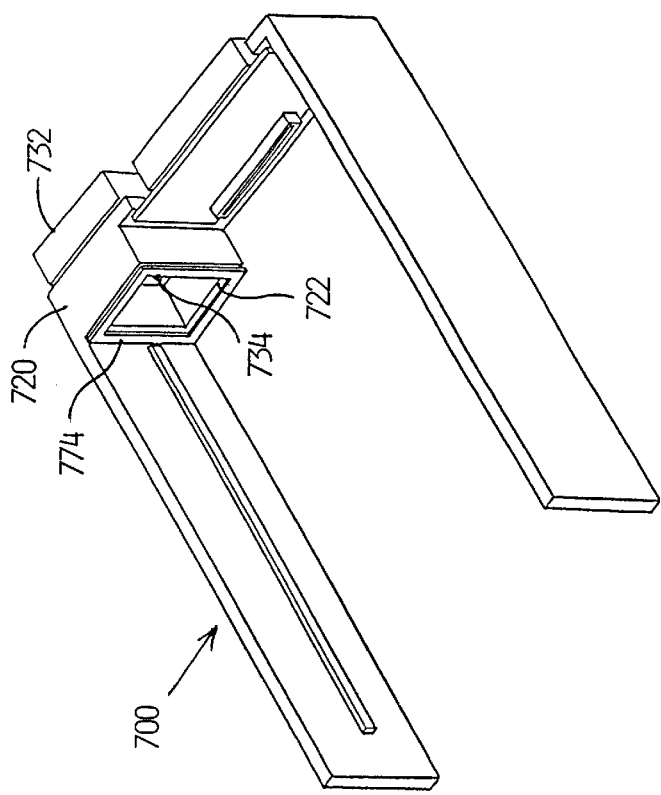
FIG. 18 shows a schematic perspective view of an alternate embodiment of the bracket of FIG. 2.
Figure 17:
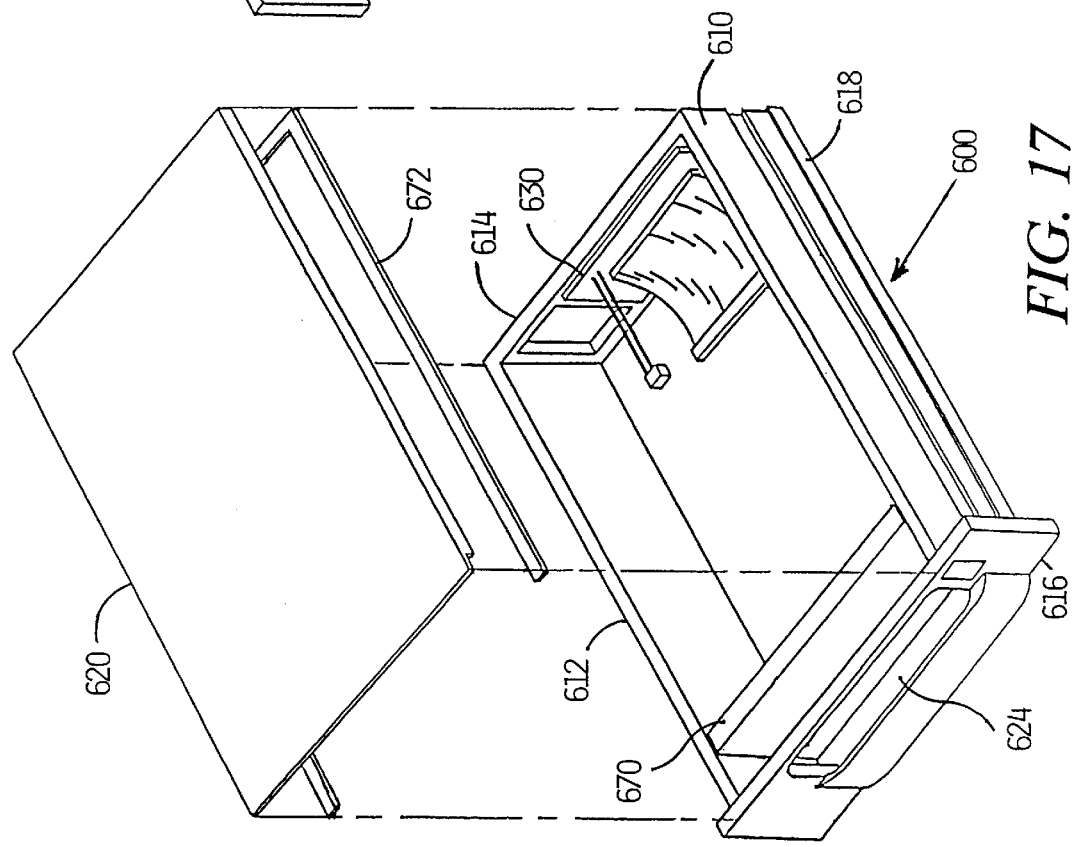
FIG. 17 shows a partially exploded schematic perspective view of an alternate embodiment of the cartridge of FIG. 1.

An additional alternate embodiment of the present invention is depicted in FIGS. 17 and 18 showing a removable cartridge device which includes removable cartridge 600 for housing a data storage device and matching U-shaped bracket 700. Cartridge 600 and bracket 700 are similar to cartridge 100 (FIG. 1) and bracket 200 (FIG. 2), except that cartridge 600 and bracket 700 additionally include an air filtration system. The air filtration system includes air filtration element 670 (see, FIG. 17) positioned inside cartridge 600. An air flow sealing system is preferably included for substantially sealing the cartridge to prevent any substantial air flow into the cartridge other than through filter element 670 when a fan is expelling air from the cartridge.

Suitable materials for filter element 670 include open cell polymeric foam, fabric, paper and fiber provided that these materials are air permeable and are capable of removing dust particles. Preferably, the filter element is adapted for removing particles having a diameter of 1 micron or larger. Open cell polymeric foam, such as porous polyurethane foam, is particularly suitable for air filtration systems of the present invention. Filter element 670 is positioned in close proximity to open portion 624 of front panel 616 shown in FIG. 17. The filter element is interposed between the front panel and the position for a data storage device (not shown) installed in the cartridge. The filter element can be held in place by fitting it snugly between cartridge sides 610 and 612 and between cartridge top cover 618 and bottom cover 620. Alternately, the cartridge can be mounted into one or more channels (not shown) which can be provided inside the cartridge or by attaching it to one or more brackets (not shown) which can be mounted inside the cartridge. While open cell polymeric foam is generally suitable for use as a self supporting panel, other filter materials may require a frame-like support.

It is desirable to include an air flow sealing system for substantially sealing the cartridge to prevent any substantial air flow into the interior of the cartridge other than through filter element 670 when fan 734 is expelling air from cartridge 600, in order to prevent the introduction of dust into the cartridge. This sealing system requires an effective seal between covers 618 and 620 and the cartridge side and rear panels 610, 612 and 614. Effective seals can be obtained through tightly fitting covers, such as when the side and rear edges of the cover fit tightly against the side and rear panels. Alternately, an effective seal can be obtained by clamping the covers onto the side and rear panels, for example by using screws (not shown) to tightly hold the covers on the side and rear panels. Alternately, a sealing material (not shown) such as a rubber coating can be applied to surfaces requiring sealing. A further alternate sealing method includes disposing a gasket, such as gasket 672 shown in FIG. 17, between the bottom cover 620 and the side and rear panels of the cartridge and similarly disposing a gasket (not shown) between top cover 618 and the side and rear panels of the cartridge. Suitable gasket materials include such well known gasket materials as rubber, plastic and cork.

The sealing system of the present invention includes providing an effective seal around the edges of filter element 670 (FIG. 17). Open cell polymeric foam is particularly suited for this purpose because this material is easily compressed. For example, if panel-shaped polymer filter element 670 is slightly longer and higher than the available space in the cartridge, the edges of the filter panel will be compressed against the covers and sides of the cartridge thus providing an effective seal. In order to prevent substantial air flow between circuit board 630 (FIG. 17) and rear panel 614 it may be necessary to clamp the circuit board to the rear panel using, for example, screws or rivets (not shown). Alternately, a sealing compound or gasket (not shown) can be interposed between this circuit board and the rear panel. Also, any through holes through the circuit board which are not sealed by the rear panel should be sealed with a sealing compound or a plug. Additionally, it is highly desirable to interpose a sealing compound or gasket 774 (FIG. 18) between rear panel 614 of fully inserted cartridge 600 and contact surface 722 of air duct 720 of bracket 700 in order to maximize the efficiency of the fan assisted cooling system by preventing a substantial air flow between rear panel 614 of the cartridge and contact surface 722 of the bracket air duct.

Filter element 670 is not limited to a panel-shaped configuration. Other configurations, such as a pleated configuration are also suitable for use with the current invention. A pleated configuration advantageously provides a larger filtering surface than a panel configuration.

Figure 19:
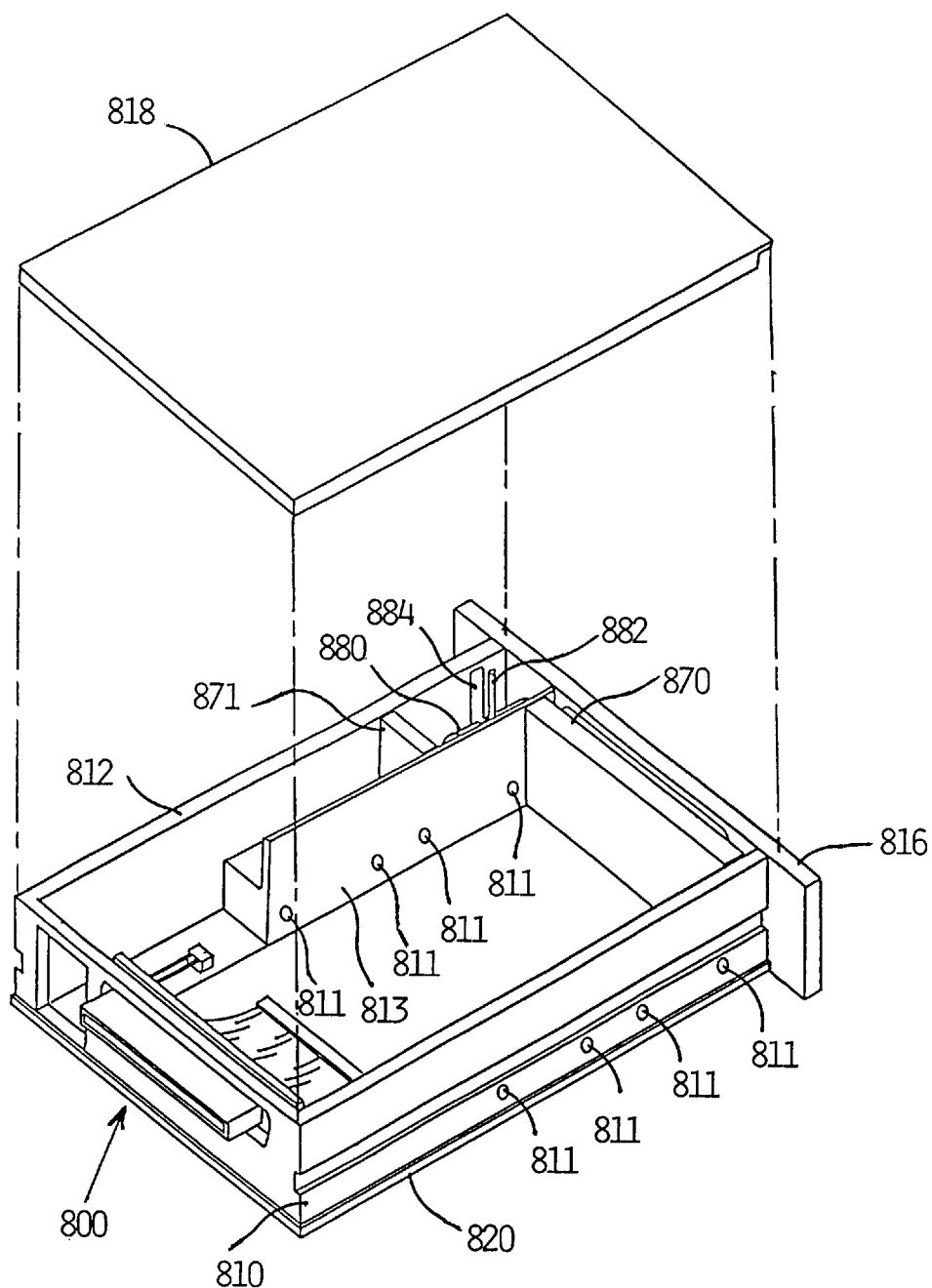
FIG. 19 shows a partially exploded schematic perspective view of an alternate embodiment of the cartridge of FIG. 1.

An alternate embodiment of cartridge 600 is illustrated in FIG. 19 showing cartridge 800 which is similar to cartridge 600, except that cartridge 800 has a lock which is optionally provided in a channel in the cartridge. Also, cartridge 800 is provided with holes in its side panels for mounting a hard drive. Some commonly available removable cartridges for housing data storage devices are provided with a lock to prevent unauthorized removal of the cartridge. These locks can be mounted in the cartridge or in the matching U-shaped bracket for the cartridge. Lock 880 of cartridge 800 is used by means of key (not shown) which is introduced in the appropriate mechanism (not shown) in front panel 816. In order to lock the cartridge in the bracket (not shown), the key is turned to rotate lock post 882 through cartridge slot 884 in side panel 812 and into a matching slot (not shown) in the U-shaped bracket. The lock mechanism of cartridge 800 includes, for example, lock 880 with post 882 and cartridge slot 884. When a filter element, such as 870, is installed inside cartridge 800 in close proximity to the front panel, slot 884 provides an opening for allowing the introduction of unfiltered air into the interior of the cartridge. The introduction of unfiltered air through this slot is prevented by placing a second filter element 871 between cartridge side wall 812 and channel wall 813. Alternately, element 871 can include a material which does not provide an air filtering function but which solely functions to substantially block air flow from slot 884 into the interior of cartridge 800. Any hard drive mounting holes 814 which are not used for mounting the hard drive need to be closed in order to prevent the introduction of unfiltered air into the cartridge. These holes can be blocked using appropriate, tightly fitting rubber, plastic, or metal plugs.

An alternate embodiment of the present invention is illustrated in FIGS. 20 and 21. Removable cartridge 900 depicted in FIG. 20 includes a housing having side panels 910 and 912, rear panel 914, front panel 916, top panel 918 and bottom panel 920. Front panel 916 has open portion 924 adjacent pull portion 922. Rear panel 914 has an open portion 926 which is contiguous with an open portion 927 in adjoining side panel 912. This cartridge includes a connector such as a ribbon connector 932, a circuit board 930 and a temperature sensing element 936. An additional connector (not shown) protrudes through an open portion (not shown) in rear panel 914. Front panel 916 of cartridge 900 (FIG. 20) has open portions 923 and 925 to receive formations 1023 and 1025 respectively of U-bracket 1000 (FIG. 21) when cartridge 900 is fully inserted in matching U-bracket 1000.

As shown in FIG. 21, U-bracket 1000 includes side panels 1010 and 1012, rear panel 1014 and channel panel 1011. A fan assembly 1032, having an electrically driven fan 1034, is mounted on rear panel 1014 such that fan 1034 communicates with open portion 1016 of rear panel 1014. U-bracket 1000 includes a circuit board 1026 and connectors 1028 and 1030. Bracket side panel 1012 and channel panel 1011 are connected through connecting portions 1013 and 1015. Connector portion 1013 which is positioned at the open end of the U-bracket has protruding formations 1025 and 1023. Formation 1025 has a data storage device identification number display LED which is connected (not shown) to circuit board 1026. A number selection switch (not shown), similar to selector switch 152 of cartridge 100 (FIG. 4), is mounted on cartridge 900 (FIG. 21), to select identification numbers for display by the LED on formation 1025. This switch is connected to the LED display of bracket 1000 through appropriate connectors, such as connectors mounted on circuit board 930 and 1026, forming mating contacts when the cartridge is fully inserted in the bracket.

Formation 1023 of bracket 1000 is the exposed portion of a lock having a post (not shown) which can be rotated such that it projects through slot 1017 of U-bracket side panel 1012 into a matching slot (not shown) in cartridge side panel 912 when the cartridge is fully inserted in the bracket. This lock is similar to lock 880 shown in FIG. 19. A channel 1019 is formed between panels 1012 and 1011, and connecting portions 1013 and 1015. This channel can be used to position a lock or to position connections, such as wires between the LED of formation 1025 and circuit board 1026.

When cartridge 900 is fully inserted in computer mounted bracket 1000, connector 932 of cartridge 900 is connected to the computer's circuitry (not shown) in a similar manner as described with regard to cartridge 100 and bracket 200. When fully inserted, open portions 926 and 927 of cartridge 900 communicate with fan 1034 of bracket 1000, thereby forming an air passage between the fan and the interior of the cartridge. Open portion 924 of cartridge 900 (FIG. 20) forms an air flow inlet while open portions 926 and 927 form an air flow outlet of this cartridge. Cartridge 900 is adapted for sliding into bracket 1000 in a drawer-like fashion, as described in connection with cartridge 100 and bracket 200.

Temperature sensing element 936 of cartridge 900 has similar functions as temperature sensing element 136 of cartridge 100. Fan speed control and fan malfunction alarms of fan 1034 (bracket 1000) are similar to those of fan 234 (bracket 200). The LED of formation 1025 of bracket 1000 is similar to LED 125 of cartridge 100, except that the LED of formation 1025 is mounted on the bracket instead of the cartridge.

Cartridge 900 can additionally be equipped with a filter element 970 (FIG. 20) to provide filtered air to the interior of the cartridge as described in connection with cartridge 600 shown in FIG. 17. Preferably, an air flow sealing system should be used in conjunction with filter element 970, as described in connection with cartridge 600.

It will be understood that embodiments of the present invention utilizing an air filtration system depend more strongly on fan assisted cooling than embodiments without a filtration system since the air filtration system blocks air flow other than the air flow which is caused by the fan. It is thus particularly desirable to use systems for fan speed control and for fan failure alarm in conjunction with removable cartridges having an air filtration system.

U-brackets of this invention are installed in computers such as personal computers, for example by using installation slots or ports which are provided in computers to install a variety of drives, such as floppy disk drives. U-bracket installation means (not shown) include hardware components known to those skilled in the art, for the installation of drives including computer mounted drive installation brackets suitable for attachment to mounting holes (not shown) in the U-bracket. Circuit means (not shown) connect the computer circuits to one or more electrical connectors of the U-bracket utilizing circuit means commonly used to connect a computer to an information storage device, such as a hard drive, including power circuits for the device.

The invention has been described in terms of specific embodiments. One skilled in the art will recognize that it would be possible to construct the elements of the present invention from a variety of means and to modify the placement of components in a variety of ways. While the preferred embodiments have been described in detail and shown in the accompanying drawings, it will be evident that various further modifications are possible without departing from the scope of the invention as set forth in the following claims.

I claim:

1. A removable cartridge device comprising:
   a) a removable cartridge including: (1) a housing having: (i) an air flow inlet and (ii) an air flow outlet, (2) a first mounting means adapted for mounting a data storage device inside the housing, (3) a temperature sensing element positioned inside the housing and (4) a temperature dependent fan speed control system adapted for controlling a fan speed by means of the temperature sensing element;
   b) a U-shaped bracket adapted for slidably receiving the cartridge including: (1) a second mounting means for mounting the bracket in a computer, (2) a first side panel, (3) a second side panel and (4) a rear panel having (i) an inside and (ii) an outside;
   c) a removable cartridge air venting system, including a fan, adapted for providing an air flow through the housing when the cartridge is fully inserted in the U-shaped bracket, wherein the fan speed is controlled by the fan speed control system; and
   d) an electrical circuit means adapted for operably connecting the computer to the cartridge when the cartridge is fully inserted in the bracket and when the bracket is mounted to the computer.

2. The device according to claim 1 wherein the data storage device comprises a hard drive.

3. The device according to claim 1 wherein the first mounting means is positioned between the air flow inlet and the air flow outlet.

4. The device according to claim 1 wherein the temperature sensing element comprises a thermistor.

5. The device according to claim 1 wherein the fan is attached to a first of the cartridge and the bracket.

6. The device according to claim 1 additionally comprising a fan failure alarm system responsive to the fan speed.

7. The device according to claim 1 additionally comprising an air filtration system to provide filtered air including a filter element mounted inside the housing such that the filter element is interposed between the air inlet and the data storage device when this is mounted in the cartridge.

8. The device according to claim 7 additionally comprising an air flow sealing system.

9. The device according to claim 7 wherein the filter element comprises open cell polymeric foam adapted for removing dust particles from an air flow.

10. The device according to claim 1 additionally comprising at least one cross brace in the bracket between the first side panel and the second side panel.

11. The device according to claim 1 wherein the air venting system comprises:
    a) an area defining an open portion in the rear panel of the bracket,
    b) the fan attached to the rear panel such that the fan is adapted for communicating with the open portion,
    c) an air duct extending from the open portion inside the rear panel, and
    d) a flange extension which extends from the duct such that the flange extension is adapted for fitting inside the cartridge air flow outlet when the cartridge is fully inserted in the bracket.

12. The device according to claim 1 wherein the electrical circuit means comprises at least one computer connection to:
    a) the data storage device when this is mounted in the cartridge;
    b) the fan; and
    c) the fan speed control system.

13. The device according to claim 1 additionally comprising a data storage device identification means for providing a data storage device identification number.

14. The device according to claim 13 wherein the identification means comprises a LED display including a manually operated selector switch.

15. The device according to claim 14 additionally comprising a fan failure alarm system responsive to the fan speed.

16. The device according to claim 15 in which the fan failure alarm system is activated when the fan speed is outside a predetermined speed range.

17. The device according to claim 16 in which the fan failure alarm system activates an alarm wherein the alarm is a flashing data storage device identification number or a combination of a flashing data storage device identification number and an audible signal.

18. The device according to claim 17 additionally comprising an air filtration system to provide filtered air including a filter element mounted inside the housing such that the filter element is interposed between the air inlet and the data storage device when this is mounted in the cartridge.

19. A removable cartridge device comprising:
    a) a removable cartridge including: (1) a housing having: (i) a front panel including an air flow inlet, (ii) a first side panel, (iii) a second side panel, (iv) a first rear panel including a first area defining a first open portion and a second area defining a second open portion comprising an air flow outlet, wherein the first rear panel has an inside and an outside, (v) a top panel and (vi) a bottom panel, (2) a first mounting means adapted for mounting a hard drive inside the housing, (3) a temperature sensing means comprising a thermistor, wherein the temperature sensing means is positioned inside the housing, (4) a temperature dependent fan speed control system adapted for controlling a fan speed by means of the temperature sensing element, (5) a hard drive identification means comprising: (i) a LED display and (ii) a selector switch mounted on the housing, (6) a fan failure alarm system responsive to the fan speed wherein: (i) the fan failure alarm system is activated when the fan speed is outside a predetermined speed range and (ii) the alarm is a flashing hard drive identification number or a combination of a flashing hard drive identification number and an audible signal, (7) a first circuit board mounted on the inside of the first rear panel, (8) a first connector which is connected to the first circuit board and which is adapted for connecting to the hard drive when this is mounted inside the cartridge and (9) a second connector which is mounted to the first circuit board such that the second connector protrudes through the first open portion;

b) a U-shaped bracket adapted for slidably receiving the cartridge including: (1) a second mounting means for mounting the bracket in a computer, (2) a third side panel, (3) a fourth side panel and (4) a second rear panel having (i) an inside, (ii) an outside, (iii) a third area defining a third open portion, (iv) a fourth area defining a fourth open portion, (v) an air duct extending from the inside of the second rear panel such that the air duct is substantially contiguous with the third open portion wherein the air duct has a contact surface for contacting the outside of the first rear panel such that the duct is substantially contiguous with the outlet when the cartridge is fully inserted in the bracket, (vi) a second circuit board mounted to the inside of the second rear panel, (vii) a third connector which is connected to the second circuit board such that the third connector makes an electrically mating contact with the second connector when the cartridge is fully inserted in the bracket, (viii) a fourth connector which is connected to the second circuit board such that the fourth connector protrudes through the fourth open portion, wherein the fourth connector is adapted for connecting to the computer and wherein the fourth connector is adapted for connecting to the hard drive, when this is mounted in the cartridge, through the second circuit board, the third connector, the second connector, the first circuit board and the first connector; and c) a fan mounted on the outside of the second rear panel such that the fan communicates with the fourth open portion, wherein the speed of the fan is controlled by the fan speed control system.

20. The device according to claim 19 additionally comprising a filter element which is positioned inside the cartridge such that the filter element is interposed between the air flow inlet and the hard drive when this is mounted in the cartridge.

21. The device according to claim 20 additionally comprising:
 a) a lock mechanism; and
 b) a means for substantially preventing unfiltered air from entering the cartridge through the lock mechanism.

22. The device according to claim 19 additionally comprising a lock for locking the cartridge onto the bracket.

23. A method for removably mounting a data storage device comprising the steps of:
 a) providing a data storage device;
 b) providing a removable cartridge including: (1) a housing having: (i) an air flow inlet and (ii) an air flow outlet, (2) a first mounting means adapted for mounting a data storage device inside the housing, (3) a temperature sensing element positioned inside the housing and (4) a temperature dependent fan speed control system adapted for controlling a fan speed by means of the temperature sensing element;
 c) providing a U-shaped bracket adapted for receiving the cartridge including: (1) a second mounting means for mounting the bracket in a computer, (2) a first side panel, (3) a second side panel and (4) a rear panel having (i) an inside and (ii) an outside;
 d) providing a removable cartridge air venting system, including a fan, adapted for providing an air flow through the housing when the cartridge is fully inserted in the U-shaped bracket, wherein the fan speed is controlled by the fan speed control system;
 e) providing a first electrical circuit means adapted for operably connecting the computer to the bracket when the bracket is mounted to the computer;
 f) providing a second electrical circuit means adapted for operably connecting the cartridge to the bracket when the cartridge is fully inserted in the bracket;
 g) providing a third electrical circuit means for operably connecting the data storage device to the cartridge;
 h) mounting the bracket to the computer;
 i) using the first electrical circuit means to connect the computer to the bracket;
 j) mounting the data storage device in the cartridge;
 k) using the third electrical circuit means to connect the data storage device to the cartridge; and
 l) fully inserting the cartridge into the bracket whereby the data storage device is electrically connected to the computer through the first, second and third electrical circuit means.

24. The method of claim 23 wherein the step of providing a data storage device comprises providing a hard drive.

25. The method of claim 23 wherein the step of providing a removable cartridge additionally comprises the step of providing an air filtration system for use in the cartridge.

* * * * *